Nov. 28, 1950 W. J. ZEPP 2,532,004
CHILD'S VEHICLE AND PARCEL CARRIER
Filed Sept. 27, 1946 2 Sheets-Sheet 1

INVENTOR.
W. J. ZEPP
BY
A. Yates Dowell
ATTORNEY

Nov. 28, 1950   W. J. ZEPP   2,532,004
CHILD'S VEHICLE AND PARCEL CARRIER

Filed Sept. 27, 1946   2 Sheets-Sheet 2

INVENTOR.
W. J. ZEPP
BY
A. Yates Dowell
ATTORNEY

Patented Nov. 28, 1950

2,532,004

UNITED STATES PATENT OFFICE 2,532,004

CHILD'S VEHICLE AND PARCEL CARRIER

William J. Zepp, Yorktowne Village, Md.

Application September 27, 1946, Serial No. 699,886

8 Claims. (Cl. 155—22)

This invention relates to a child's vehicle and more particularly to a combination child's vehicle and parcel carrier of such a character as may be easily and quickly converted from a vehicle used to transport a small child in a horizontal position to a parcel carrier or a combination parcel carrier and child's vehicle wherein a larger child may be transported in a sitting position.

Heretofore vehicles designed to be used to transport small children could also be used as walkers or strollers but sufficient space was not provided to accommodate within large parcels or a child's accessories and at the same time providing ample space to transport the child comfortably while seated or in a horizontal position.

An object of the invention is to overcome the disadvantages enumerated and to provide a child's vehicle capable of being easily and simply converted into either a baby carriage, wherein the child may be transported in a horizontal position; a combination parcel carrier and child's vehicle, wherein the child may be transported in a sitting position, or a parcel carrier, wherein the entire space in the body of the vehicle may be used to accommodate the parcels.

Another object of the invention is to provide a single vehicle which may be used to transport children from the time when they are small and must be transported in a horizontal position to the time when they are larger and desire to be pushed about in a sitting position and at the same time always retain the vehicle's utility as a parcel carrier either with or without the child.

Another object of the invention is to provide a simple, rigid and durable but light weight and easily operable combination child's vehicle and parcel carrier of the character indicated and one which may be manufactured and sold at low costs.

Further objects and advantages of the invention will be apparent from the following description taken in conjunction with the drawings, wherein.

Figure 1:
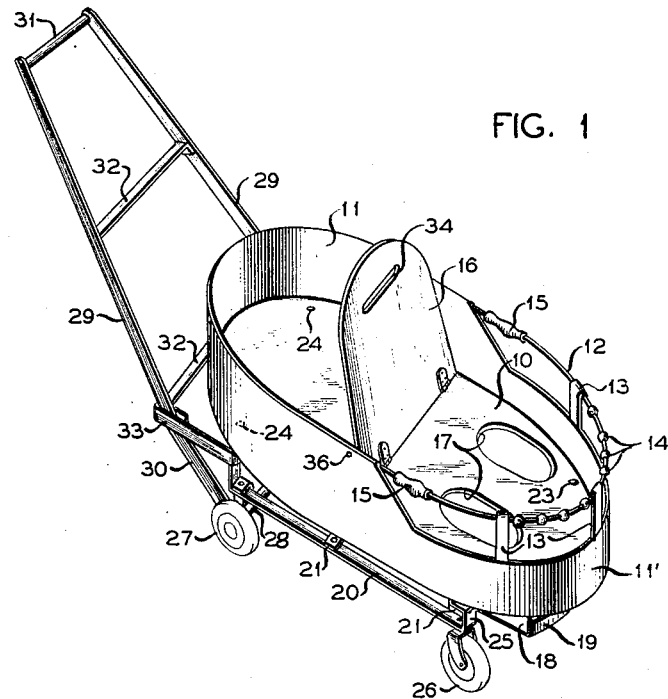
Fig. 1 is a perspective view showing the combined child's vehicle and parcel carrier arranged to accommodate parcels and the child in a sitting position.

Referring to the drawings, the invention comprises a vehicle with a straight body with rounded ends having a base 10 and one continuous side 11 extending completely around and perpendicular to the base. The rear half 11 of the body panel is higher and forms a receptacle for parcels. The front half 11' of the body panel is lower than the rear half with a wire 12 continuing around the front half 11' at the same level as the rear half 11. The wire 12 is supported by braces 13 and has brightly colored beads 14 arranged thereon between the said braces and hand grips 15 between the braces and the rear half of the side panel. The said hand grips are so connected to wire 12 to allow them to be adjusted and used by a small or large child.

Hingedly connected to the base of the said body is a back-rest 16 for child when seated in vehicle. Holes 17 are provided through the body base 10 so that when used as a stroller, the child may sit comfortably in the front compartment of the body with his legs extended through the said holes and his feet on the foot-rest 18. A guard 19 is provided on the foot-rest to protect the child's feet from objects which may be lying on the floor or ground.

The body is supported by a chassis formed of side supports 20, a cross support 21 and a rear wheel axle holder 22. The said side supports are attached to the front portion of the body base by bolts 23 and extend along each side of the vehicle to the rear thereof where they are attached to the body base 10 by bolts 24. U-shaped bends 25 in the side supports 20 form swivel housings for the front wheels 26. The rear wheels 27 support the chassis by their axle 28 which is extended through the rear wheel axle holder 22. The said axle holder is welded or bolted to the side supports 20 and serves as a rear cross support.

The vehicle is propelled by means of a push handle which is composed of side bars 29 with terminals 30 secured together by handle 31 and two cross bars 32 and held rigidly in position with respect to the chassis by brace 33.

Figure 5:
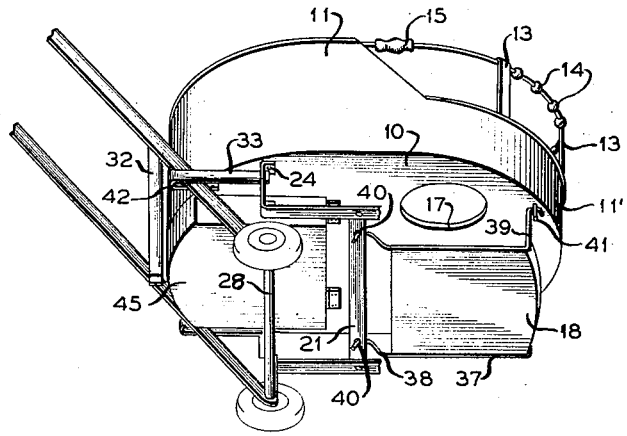
Fig. 5 is a bottom perspective view of the vehicle.
Figure 2:
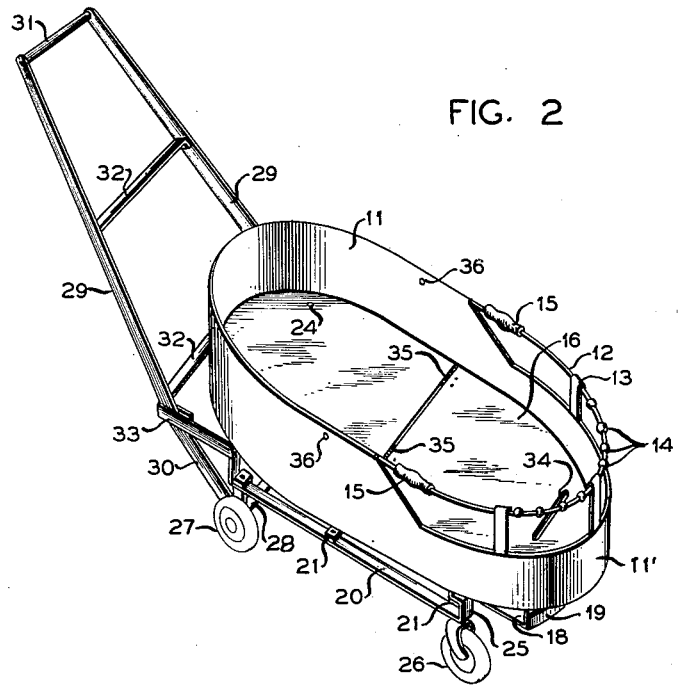
Fig. 2 is a perspective view showing the invention arranged as a vehicle wherein a child may be transported in a horizontal position or the entire space may be devoted to parcel carrying.
Figure 3:
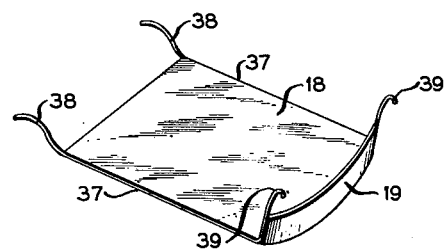
Fig. 3 is a perspective view of the foot-rest shown in Fig. 1, detached from the vehicle.

The vehicle is shown in Fig. 2 with the back-rest 16 in a down position. There the back-rest is flush with the body base 10 and in position to allow the child to be transported in a horizontal position or to allow the entire space within the body to be used as a parcel carrier. The back-rest 16 may easily be raised by handle 34 and is pivoted on hinges 35 until it rests on stops 36 in its up position as shown in Fig. 1 thereby dividing the body into a front and rear compartment. The foot-rest 18 details of which are shown in Fig. 3 is formed of a flat sheet attached to two tension wires 37 at each side. The ends of the wires 37 extend beyond the edge of the sheet and form hooks 38 and 39. Hooks 38 attach the rear portion of the foot-rest to the chassis cross support 21 through holes 40. Hooks 39 attach the front portion of the foot-rest to the underside of the body base 10 through eye-screws 41. The detail of both connections are shown in Fig. 5.

The spring tension in wires 37 which form the hooks 38 and 39 allow the foot rest to be snapped into place and there remain securely attached while in use. The foot-rest may be easily removed by disengaging the hooks. In this way the vehicle may be used as a walker to assist a young child to learn to walk. The holes 17 are arranged as an improved straddle seat to support the child and allow him to walk in any direction he desires by the action of swivelling front wheels.

Figure 4:
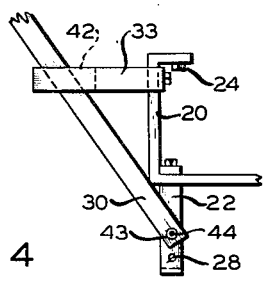
Fig. 4 is a view in elevation of a portion of the handle showing the details of the handle-chassis connection.

Fig. 4 shows the details of push handle chassis detachable connection.

The said push handle is snapped into position by inserting the terminals 30 through slots 42 in braces 33 and springing said terminals outwardly allowing the holes 43 to be slipped around pin 44 on the axle holder 22.

Figure 6:
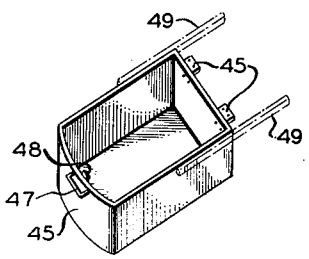
Fig. 6 is a perspective view showing the details of the utility drawer.

A utility drawer 45 is attached to the underside of base 10 and attached thereto a hinged element 46 the details of which are shown in Fig. 6. Handle 47 is provided to open and close the said drawer. When the drawer is in a closed position it may be securely fastened to body base 10 by catch 48. While the said utility drawer may be opened and closed by the use of hinges 46 the same result may be obtained by a sliding attachment 49 also shown in Fig. 6.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A vehicle comprising a body of oval shape having upstanding side walls and a flat bottom, a pair of elongated holes in the forward portion of said bottom constructed and arranged to receive the legs of a person, a member hingedly mounted transversely of said bottom substantially midway of the length thereof, said member being movable from a substantially horizontal position to a substantially upright position to form a backrest and a partition between the forward and rear portions of said body and constructed and arranged when in horizontal position to overlie said holes thus providing an imperforate bottom surface, running gear attached to said body and including ground-engaging wheels, a detachable handle having longitudinal members, rearwardly extending brackets secured to said running gear, said brackets being provided with slots to slidably receive said longitudinal members, said longitudinal members being provided with apertures adjacent their lower ends, studs secured to said running gear and engaging in said apertures when said handle is in operative position, said handle being detachable from said vehicle by springing said longitudinal member sufficiently to disengage said apertures from said studs and removing said longitudinal members from said slots.

2. A vehicle comprising a body of oval shape having side walls and a bottom, a pair of holes in the forward portion of said bottom constructed and arranged to receive the legs of a person, a member hingedly mounted transversely of said bottom, said member being movable from a substantially horizontal position to a substantially upright position to form a backrest and a partition between the forward and rear portions of said body and constructed and arranged when in horizontal position to overlie said holes thus providing an imperforate bottom surface, running gear attached to said body and including ground-engaging wheels, a detachable handle having longitudinal members, brackets secured to said running gear, said brackets being provided with slots to slidably receive said longitudinal members, said longitudinal members being provided with apertures adjacent their lower ends, studs secured to said running gear and engaging in said apertures when said handle is in operative position, said handle being detachable from said vehicle by springing said longitudinal members sufficiently to disengage said apertures from said studs and removing said longitudinal members from said slots.

3. A vehicle comprising a body of oval shape having side walls and a bottom, a pair of holes in the forward portion of said bottom constructed and arranged to receive the legs of a person, a member hingedly mounted transversely of said bottom, said member being movable from a substantially horizontal position to a substantially upright position to form a backrest and a partition between the forward and rear portions of said body and constructed and arranged when in horizontal position to overlie said holes thus providing an imperforate bottom surface, running gear attached to said body and including ground-engaging wheels, a handle having longitudinal members provided with apertures adjacent their lower ends, means on said running gear to slidably receive said longitudinal members and means on said running gear to engage said apertures when said handle is in operative position, said handle being detachable from said vehicle by springing said longitudinal members sufficiently to disengage said apertures from said means.

4. A vehicle comprising a body having side walls and a bottom, a pair of holes in the forward portion of said bottom constructed and arranged to receive the legs of a person, a member hingedly mounted laterally of said bottom, said member being movable from a substantially horizontal position to a substantially upright position to form a backrest and a partition between the forward and rear portions of said body and constructed and arranged when in horizontal position to overlie said holes thus providing an imperforate bottom surface running gear attached to said body and including ground-engaging wheels and a handle removably attached to said running gear.

5. A vehicle comprising a body having side walls and a bottom, a pair of holes in the forward portion of said bottom constructed and arranged to receive the legs of a person, a member hingedly mounted transversely of said bottom, said member being movable from a substantially horizontal position to a substantially upright position to form a backrest and a partition between the forward and rear portions of said body and constructed and arranged when in horizontal position to overlie said holes thus providing an imperforate bottom surface, running gear attached to said body and including ground-engaging wheels and a handle secured to said running gear.

6. A vehicle as defined in claim 5 in which the upper forward portion of said side wall is removed, a plurality of upstanding members on the lower forward portion of said side wall, a rod-like rail secured to said upstanding members and to the rear side walls of said body and hand grips adjustably mounted on said rail.

7. A vehicle as defined in claim 5 and having adjustable hand grips for engagement by the hands of a person riding in said vehicle.

8. A vehicle as defined in claim 5 in which there is provided a foot rest removably secured to said bottom below said holes and serving to be engaged by the feet of a person riding in said vehicle and projecting through said holes.

WILLIAM J. ZEPP.

REFERENCES CITED

The following references are of record in the file of this patent:

UNITED STATES PATENTS

| Number | Name | Date |
|---|---|---|
| D. 138,468 | Call | Aug. 8, 1944 |
| D. 144,064 | Mendelson et al. | Mar. 5, 1946 |
| 606,494 | Weddell et al. | June 28, 1898 |
| 1,406,397 | Lincoln | Feb. 14, 1922 |
| 1,652,004 | Fischer | Dec. 6, 1927 |
| 1,793,848 | Gill et al. | Feb. 24, 1931 |
| 1,876,111 | Van Guelpen | Sept. 6, 1932 |
| 1,978,915 | Siebert et al. | Oct. 30, 1934 |
| 2,415,146 | Nanna | Feb. 4, 1947 |
| 2,427,964 | Hansburg | Sept. 23, 1947 |

FOREIGN PATENTS

| Number | Country | Date |
|---|---|---|
| 18,037 | Great Britain | 1891 |